United States Patent [19]

Sato

[11] Patent Number: 4,508,867
[45] Date of Patent: Apr. 2, 1985

[54] POLYMER COMPOSITIONS COMPRISING POLYAMIDES, CARBOXYLATED (METH)ACRYLONITRILE-BUTADIENE RUBBER, AND NONPOLYMERIC ADDITIVES

[75] Inventor: Kyosaku Sato, Sarnia, Canada

[73] Assignee: Polysar Limited, Sarnia, Canada

[21] Appl. No.: 549,502

[22] Filed: Nov. 7, 1983

[51] Int. Cl.³ .......................... C08K 3/16; C08K 3/10; C08K 3/20
[52] U.S. Cl. .................... 524/434; 524/432; 524/433; 524/436; 524/514; 525/183; 525/184
[58] Field of Search ............... 525/183, 184; 524/434, 524/436, 514, 433, 432

[56] References Cited

U.S. PATENT DOCUMENTS

| 3,151,186 | 9/1964 | Lucke | 524/434 |
|---|---|---|---|
| 3,691,131 | 9/1972 | Kelmchuk | 524/436 |
| 4,105,709 | 8/1978 | Iwami et al. | 524/514 |
| 4,167,614 | 9/1979 | Ciferri et al. | 524/436 |
| 4,173,556 | 11/1979 | Coran et al. | 525/185 |
| 4,176,227 | 11/1979 | Baggett et al. | 524/436 |
| 4,197,379 | 4/1980 | Coran et al. | 525/142 |
| 4,247,665 | 1/1981 | Daniels et al. | 525/183 |
| 4,310,638 | 1/1982 | Coran | 525/183 |
| 4,335,223 | 6/1982 | Flood et al. | 525/183 |
| 4,346,194 | 8/1982 | Roura | 525/66 |
| 4,356,286 | 10/1982 | Bethea et al. | 525/183 |
| 4,381,366 | 4/1983 | Sanderson et al. | 525/66 |
| 4,383,083 | 5/1983 | Nielinger et al. | 525/183 |
| 4,404,325 | 9/1983 | Mason et al. | 525/183 |
| 4,420,580 | 12/1983 | Herman et al. | 524/436 |

OTHER PUBLICATIONS

"Effect of Metal Halides on the Glass Transition Temperature of Nylon-6", Siegmann et al., (1979).

Primary Examiner—Herbert J. Lilling
Attorney, Agent, or Firm—Stevens, Davis, Miller & Mosher

[57] ABSTRACT

Vulcanizable rubbery compositions, and a process for their production, comprise a polyamide, a synthetic rubbery polymer comprising (meth)acrylonitrile, α, β-unsaturated carboxylic acid and butadiene and as non-polymeric additives a halide of lithium, magnesium, calcium or zinc and as oxide a hydroxide of magnesium, calcium, barium or zinc or a peroxide of calcium or zinc and sulphur vulcanization active agents.

16 Claims, No Drawings

POLYMER COMPOSITIONS COMPRISING POLYAMIDES, CARBOXYLATED (METH)ACRYLONITRILE-BUTADIENE RUBBER, AND NONPOLYMERIC ADDITIVES

BACKGROUND OF THE INVENTION

This invention is directed to novel vulcanizable rubbery compositions comprising a nylon and a carboxylated synthetic rubber and to a process for making such compositions.

DESCRIPTION OF THE PRIOR ART

It is well known in the prior art that polyvinyl chloride can be mixed with butadiene-acrylonitrile polymers (nitrile polymers) and with carboxylated butadiene-acrylonitrile polymers (carboxylated nitrile polymers) to form useful compositions. It is also known from U.S. Pat. No. 4,197,379 that crystalline polyamide and a nitrile polymer may be mixed together and modified by reaction with a dimethylol phenol compound to yield an elastoplastic composition. It is also known from the article in Die Makromolekulare Chemie, Rapid Communications 1980 Volume 1 pages 113 to 117 that certain metal salts influence the softening temperature of nylon 6.

SUMMARY OF THE INVENTION

The invention is directed in one embodiment to a vulcanizable rubbery composition comprising, per 100 parts by weight of polymeric materials, as one polymeric material from about 10 to about 32.5 parts by weight of a crystalline polyamide and as a second polymeric material from about 67.5 to about 90 parts by weight of a synthetic rubbery polymer which polymer comprises, for a total of 100 parts by weight, from about 25 to about 40 parts by weight of acrylonitrile or methacrylonitrile, from about 0.5 to about 10 parts by weight of one or more $\alpha,\beta$-unsaturated carboxylic acid and the balance butadiene, and as non-polymeric additives from about 0.1 to about 15 weight percent based on polyamide of an additive selected from the halides of lithium, magnesium, calcium and zinc, and from about 1 to about 10 parts by weight per 100 parts by weight of polymeric materials of an additive selected from the oxides and hydroxides of magnesium, calcium, barium and zinc and the peroxides of calcium and zinc and further comprises sulphur vulcanization active agents.

The invention is directed in a second embodiment to a process for producing a vulcanizable rubbery polymeric composition comprising mixing from about 10 to about 32.5 parts by weight of a crystalline polyamide and from about 0.1 to about 15 weight percent based on the polyamide of an additive selected from the halides of lithium, magnesium, calcium and zinc at a temperature of from about 180° C. to the melting point of the polyamide for a time sufficient to yield an essentially uniform mixture, from about 67.5 to about 90 parts by weight of a synthetic rubbery polymer, for a total of 100 parts by weight of polyamide and synthetic polymer, is mixed with said polyamide and additive or subsequently added to and mixed with the polyamide-additive mixture, said synthetic polymer comprising, for a total of 100 parts by weight, from about 25 to about 40 parts by weight of acrylonitrile or methacrylonitrile, from about 0.5 to about 10 parts by weight of one or more $\alpha,\beta$-unsaturated carboxylic acid and the balance butadiene, an additive selected from the oxides and hydroxides of magnesium, calcium, barium and zinc and the peroxides of calcium and zinc in an amount of from about 1 to about 10 parts by weight per 100 parts by weight of polyamide and synthetic polymer, is added and mixed therewith in a second stage of mixing at a temperature of from about 50° to about 125° C., and sulphur vulcanization active agents are added in said second stage or in a third stage of mixing to yield an essentially uniform vulcanizable rubbery polymeric composition.

DETAILED DESCRIPTION OF THE INVENTION

The crystalline polyamide, also known as nylon, used in this invention is a high molecular weight solid polymer having recurring amide groups within the polymer. Such polyamides are well known and may be prepared by polymerization of one or more epsilon-lactams or amino acids or by condensation of one or more dibasic acids and one or more diamines. Examples of such polyamides include nylon 6 (polycaprolactam), nylon 12 (polylauryllactam), nylon 6,6 (polyhexamethyleneadipamide), nylon 6,10 (polyhexamethylenesebacamide), nylon 11 (condensation product of 11-amino-undecanoic acid), and mixtures thereof. The majority of such nylons have melting points between about 160° and 230° C.

The synthetic rubbery polymer used in this invention is a high molecular weight solid polymer having recurring carboxylic groups along the polymer chain. Such synthetic polymers are well known and may be prepared by the well known emulsion free radical polymerization process and comprise from about 25 to about 40 parts by weight of acrylonitrile or methacrylonitrile, from about 0.5 to about 10 parts by weight of one or more $\alpha,\beta$-unsaturated carboxylic acid and the balance butadiene, for a total of 100 parts by weight. Suitable such $\alpha,\beta$-unsaturated carboxylic acids include acrylic, methacrylic, fumaric, maleic and itaconic acids. Preferably the polymer contains from about 25 to about 40 parts by weight of acrylonitrile. The molecular weight of the polymer is generally described by the Mooney viscosity (ML 1+4 at 100° C.) of from about 40 to about 80.

One additive incorporated into the compositions of this invention is selected from the halides of lithium, magnesium, calcium and zinc and is present in the composition at a level of from about 0.1 to about 15 weight percent based on the polyamide. While it is not clear what the role of this additive is, it is believed that it may influence the melting point of the polyamide and/or it may influence the compatibility of the polyamide and the synthetic polymer. When this additive is present in the polyamide in the range of from about 0.1 to about 1 or 2 weight percent, it is believed that the additive has little effect on the melting point of the polyamide. Suitable halides of the metals listed include the bromides, chlorides and iodides. On a cost basis, the chlorides and bromides are preferred and of these the chlorides are most preferred. Lithium chloride is a most preferred additive. The amount of this additive is preferably from about 2 to about 10 weight percent and most preferably from about 4 to about 8 weight percent, based on the polyamide.

A second additive incorporated into the compositions of this invention is selected from the oxides and hydroxides of magnesium, calcium, barium and zinc and the peroxides of calcium and zinc at a level of from about 1 to about 10 parts by weight per 100 parts by weight of polyamide and synthetic polymer. It is believed that this additive reacts with the acid groups present in the synthetic polymer leading to the formation of ionic bonds which act like crosslinks in the composition and provide part of the desired strength properties, the crosslinks formed during the vulcanization also contributing to the strength properties. A preferred level of this additive is from about 2 to about 8, and most preferably from about 3 to about 6, parts by weight per 100 parts by weight of polyamide plus synthetic polymer. On a cost and availability basis, zinc oxide, hydroxide and peroxide, magnesium oxide and hydroxide, and calcium oxide and hydroxide are preferred. Zinc peroxide is the most preferred additive and may be used as a masterbatch with a nitrile polymer.

The compositions of this invention are vulcanizable compositions. Such vulcanizable compositions further comprise sulphur vulcanization active agents, such as sulphur and sulphur containing compounds and may also contain, if not already present, zinc peroxide especially as a masterbatch with a butadiene-acrylonitrile polymer in a weight ratio of about 45:55 to 55:45 of zinc peroxide: butadiene-acrylonitrile polymer. The vulcanization active agents may be added in the second stage of mixing or in a third stage of mixing. Sulphur containing compounds are the well-known accelerators including the benzothiazyl disulphides, the mercapto benzothiazoles, the sulphenamides, the thiuram mono-, di- and tetra-sulphides, and the like. Zinc peroxide may act as both the second additive and as a vulcanization active agent: however, sulphur and/or sulphur containing compounds are present as vulcanization active agents. Vulcanization is undertaken by heating at temperatures from about 150° to about 180° C. for times of from about 5 to about 60 minutes thereby forming covalent crosslinks as known and providing the vulcanizate with rubbery properties.

The compositions of this invention may also contain any one or more of fillers, plasticizers, processing aids, antioxidants or stabilizers and other components. Suitable fillers for use in the compositions include carbon black, titanium dioxide, silica, calcium silicate, clay and calcium carbonate and mixtures thereof in amounts from about 5 to about 100 parts by weight per 100 parts by weight of polyamide plus synthetic polymer and additional zinc oxide in amounts up to about 20 parts by weight per 100 parts by weight of polyamide plus synthetic polymer. Suitable plasticizers include those well known for use with nitrile polymers such as the phthalate compounds, the phosphate compounds, the adipate compounds, the alkyl carbitol formal compounds, the coumarone-indene resins and the like and may be present in amounts up to about 20 parts by weight per 100 parts by weight of polyamide plus synthetic polymer. Suitable processing aids include those well known in the rubber industry, such as the low molecular weight polyethylenes, acrylic-type polymers, mixtures thereof and the like, and suitable antioxidants or stabilizers are those well known in the rubber and plastics industries and especially include those materials known to be of value for high temperature stabilization including the hindered phenols, substituted phosphites, the complex cadmium-barium stabilizers, mixtures thereof and the like. Such processing aids may be used at levels of from about 0.2 to about 5 parts by weight of each such processing aid and such antioxidants or stabilizers may be used at levels of from about 0.1 to about 2 parts by weight of each such antioxidant or stabilizer, both per 100 parts by weight of polyamide plus synthetic polymer.

The process of producing the compositions of this invention comprises mixing the polyamide and the first additive which is the halide of lithium, magnesium, calcium or zinc at a temperature of from about 180° C. to the melting point of the polyamide for a time long enough to yield an essentially uniform mixture. Generally, the temperature for such mixing will be from about 180° to about 230° C. Such mixing may be undertaken in rubber processing equipment such as internal mixers and mixing extruders. The synthetic polymer may also be mixed with the polyamide and the first additive, especially when mixing in an internal mixer. Alternatively, the synthetic polymer may subsequently be added to and mixed with the polyamide-additive mixture. Processing aids, plasticizers, fillers, antioxidants and stabilizers generally may also be added to the composition at this stage. The addition of the second additive and the vulcanization active agents and optionally the synthetic polymer will generally be made as a second stage and may be undertaken on conventional rubber processing equipment or in an internal mixer at a lower temperature such as from about 50° to about 125° C., such lower temperature being necessary in order to avoid premature vulcanization. The vulcanization active agents may be added in a third stage of mixing. It is significant that the compositions of this invention can be processed at such low temperatures in spite of the presence of the polyamide in the compositions.

It is surprising that the polyamide and synthetic polymer can be mixed together satisfactorily to yield a vulcanizable material which can be processed on conventional rubber equipment at conventional temperatures and which, on vulcanization, has a good balance of properties. The vulcanized polymeric compositions of this invention may be used for the production of various types of hose in which the low permeability of the hose is significant, for a variety of end-uses where resistance to organic fluids is necessary over a wide temperature range, for a variety of end-uses where abrasion resistance is necessary, and the like, thus making the compositions useful in belting, hose, roll covers and mechanical goods.

The following examples illustrate the scope of the invention. All parts are parts by weight unless specified otherwise and all test procedures are ASTM procedures unless otherwise specified.

EXAMPLE 1

Blends having the compositions shown in Table I were prepared and then mixed with the vulcanization active agents as shown. Sheets were prepared and vulcanized by heating for thirty minutes at 160° C., following which standard micro-dumbbells were cut from the sheets for stress-strain testing. Additionally, portions of the vulcanized sheets were used for the other testing shown in Table I. When lithium chloride was used, the nylon 11 and lithium chloride were pre-mixed in an internal mixer at 220° C. to provide a mixture containing 8 weight per cent of lithium chloride in nylon. The carboxylated nitrile or the nitrile polymer was pre-mixed on a rubber mill with the carbon black and this mixture was then added to and mixed with the nylon or nylon-lithium chloride mixture. These components were mixed together in an internal mixer operated at a temperature of about 50° C. for a time of about 4 to 5 minutes. The vulcanization active agents were added to the polymer mixture on a rubber mill at a temperature of about 50° to about 60° C. The carboxylated nitrile polymer contained about 29 weight percent of acrylonitrile, about 7 weight percent of carboxylic acid and the balance butadiene and had a Mooney viscosity (ML 1+4 at 100° C.) of about 50 and the nitrile polymer contained about 34 weight percent of acrylonitrile and about 66 weight percent of butadiene and had a Mooney viscosity (ML 1+4 at 100° C.) of about 50. PA-50 is a masterbatch of a medium acrylonitrile-content nitrile polymer and zinc peroxide in a weight ratio of about 50:50 and constitutes the second additive as well as being a vulcanization active agent. The permeability to Fuel C is measured at 25° C. and the permeability to Freon, using Freon 12, is measured at 65° C. by determination of the Freon 12 gas permeating through a thin sheet of vulcanized rubber over a controlled period of time.

Experiment #1 is in accordance with the invention and Experiments #2, 3 and 4 are controls. The improved strength properties are readily apparent, as are the reduced permeabilities for the product of Experiment #1.

EXAMPLE 2

Using similar procedures as in Example 1, the polymer mixtures shown in Table II were prepared, were mixed with the same types and levels of vulcanization active agents as for Example 1 and vulcanized as in Example 1. Table II shows the properties measured for these vulcanizates in which silica has been used instead of the carbon black of Example 1. Experiments #11, 12 and 13 are controls and Experiment #14 is in accordance with the invention.

TABLE I

| EXPERIMENT # | 1 | 2 | 3 | 4 |
|---|---|---|---|---|
| Polymer mixture | | | | |
| Nylon 11 | — | — | 25 | 25 |
| Nylon 11 & LiCl | 27 | 27 | — | — |
| Carboxylated nitrile polymer | 100 | — | 100 | — |
| Nitrile polymer | — | 100 | — | 100 |
| Carbon black | 30 | 30 | 30 | 30 |
| Alkylated phenol antioxidant | 2 | 2 | 2 | 2 |
| Vulcanization active agents | | | | |
| Tetramethyl thiuram monosulphide | 1.5 | 1.5 | 1.5 | 1.5 |
| Sulphur | 1 | 1 | 1 | 1 |
| Stearic acid | 1 | 1 | 1 | 1 |
| PA-50 | 10 | 10 | 10 | 10 |
| Vulcanizate properties | | | | |
| Tensile strength MPa | 32.4 | 19.9 | 23.9 | 20.8 |
| Elongation % | 360 | 460 | 260 | 400 |
| 100% Modulus MPa | 8.8 | 4.5 | 9.8 | 3.3 |
| 300% Modulus MPa | 27.6 | 12.8 | — | 16.2 |
| Young's Modulus MPa | 17.5 | 6.9 | 9.8 | 5.5 |
| Tensile set % | 38 | 38 | 19 | 15 |
| Trouser tear kN/m | 9.1 | 14 | 10.1 | 7.1 |
| Taber abrasion cm$^3$/kc | 0.07 | 0.24 | 0.05 | 0.09 |
| Permeability - Fuel C g/cm$^2$ 10 days | 0.49 | 0.7 | 0.56 | 0.75 |
| Freon cm$^2$/sec/atmos × 10$^8$ | 4.3 | 10.5 | 7.1 | 21.0 |

TABLE II

| EXPERIMENT # | 11 | 12 | 13 | 14 |
|---|---|---|---|---|
| Polymer mixture | | | | |
| Nylon 11 | 25 | 25 | 25 | 25 |
| Lithium chloride | — | 2 | — | 2 |
| Nitrile polymer | 100 | 100 | — | — |
| Carboxylated nitrile polymers | — | — | 100 | 100 |
| Silica | 30 | 30 | 30 | 30 |
| Alkylated phenol antioxidant | 2 | 2 | 2 | 2 |
| Vulcanizate properties | | | | |
| Tensile strength MPa | 13.2 | 13.8 | 24.3 | 24.3 |
| Elongation % | 440 | 450 | 330 | 290 |
| 100% Modulus MPa | 2.5 | 2.5 | 8.7 | 10.8 |
| 300% Modulus MPa | 9.1 | 9.0 | 22.2 | — |
| Young's Modulus MPa | 4.2 | 3.9 | 9.7 | 9.9 |
| Tensile set % | 19 | 23 | 25 | 21 |
| Trouser tear kN/m | 8.3 | 7.7 | 11.3 | 11 |
| Taber abrasion cm$^3$/kc | 0.18 | 0.18 | 0.06 | 0.06 |
| Permeability - Fuel C g/cm$^2$ 10 days | 0.72 | 0.81 | 0.57 | 0.51 |

EXAMPLE 3

Using an internal mixer operated initially at about 150° C., the temperature of the mixer being allowed to rise to about 190° to about 200° C. during the mixing process, the vulcanizable compositions shown in Table III were prepared, following which the vulcanization active agents and second additive were added in a second stage in an internal mixer operated at about 100° C. These compositions were formed into sheets, vulcanized for 8 minutes at 165° C. and tested with the results shown in Table III. The compositions of Experiments #31 and 32 were easy to process compared to the control Experiment #33 as shown by the lower compound Mooney values. The vulcanizates of Experiments #31 and 32 were suitable for use as textile cots.

EXAMPLE 4

The compositions shown in Table IV were prepared and evaluated. Experiments #41 and 42, of which #42 is a control, illustrate by the vulcanizate properties the improved strength properties when zinc peroxide is present.

TABLE III

| EXPERIMENT # | 31 | 32 | 33 |
|---|---|---|---|
| Carboxylated nitrile polymer | 70 | 70 | 70 |
| Nylon 11 | 30 | 30 | 30 |
| Stabilizer-1 | 0.7 | 0.7 | 0.7 |
| Stabilizer-2 | 0.25 | 0.25 | 0.25 |
| Lithium chloride | 2.4 | 2.4 | — |
| Processing aid-1 | 1.5 | 1.5 | 1.5 |
| Stabilizer-3 | 2.5 | — | 2.5 |
| Max. temperature °C. | 199 | 199 | 190 |
| Cycle time minutes | 7.2 | — | 6.2 |
| Second stage mixing | | | |
| Above mix | 95 | 95 | 95 |
| Sulphur | 10 | 10 | 10 |
| Stabilizer-4 | 1.5 | 1.5 | 1.5 |
| Stabilizer-5 | 1.5 | 1.5 | 1.5 |
| Stearic acid | 0.5 | 0.5 | 0.5 |
| Processing aid-2 | 1 | 1 | 1 |
| Titanium dioxide | 10 | 10 | 10 |
| Plasticizer | 10 | 10 | 10 |
| Silica | 30 | 30 | 30 |
| Benzothiazyl disulphide | 1.5 | 1.5 | 1.5 |
| PA-50 | 10 | 10 | 10 |
| Compound Mooney viscosity MS 1 + 4 at 100° C. | 81 | 78 | 112 |
| Vulcanizate properties | | | |
| Hardness Shore A | 92 | 93 | 91 |
| Tensile Strength MPa | 28 | 25.6 | 26.9 |
| Elongation % | 145 | 140 | 130 |
| 100% Modulus MPa | 23.7 | 21.4 | 21.1 |
| Tear-Die C | 53 | 54 | 50 |
| Abrasion-NBS | 247 | 279 | 193 |

TABLE III-continued

| EXPERIMENT # | 31 | 32 | 33 |
|---|---|---|---|
| Volume resistivity ohm/cm$^3$ × 10$^9$ | 20.4 | 29.1 | 2.2 |
| Surface resistivity ohm/cm$^2$ × 10$^{10}$ | 3.1 | 3.9 | 1.9 |

NOTES:
Stabilizer-1 is a substituted phosphite; Stabilizer-2 is a hindered phenol; Stabilizer-3 is a barium/cadmium/zinc stabilizer; Stabilizer-4 is a hindered phenol; Stabilizer-5 is an erythritol derivative; Processing aid-1 is a low molecular weight polyethylene; Processing aid-2 is a material sold under the Tradename TE-80; and Plasticizer is dibutyl carbitol formal.

TABLE IV

| EXPERIMENT # | 41 | 42 |
|---|---|---|
| Nylon 11 | 20 | 20 |
| Carboxylated nitrile polymer | 80 | 80 |
| Magnesium chloride | 2 | 2 |
| Carbon black | 24 | 24 |
| Stabilizer-1 | 1.6 | 1.6 |
| Stearic acid | 0.8 | 0.8 |
| Sulphur | 0.8 | 0.8 |
| Tetramethyl thiuram monosulphide | 1.2 | 1.2 |
| PA-50 | 8 | — |
| Properties | | |
| Tensile strength MPa | 25.8 | 21.1 |
| Elongation % | 310 | 490 |
| 100% Modulus MPa | 8.5 | 5.4 |
| 300% Modulus MPa | 25 | 13.9 |
| Tensile set % | 29 | 58 |
| Young's Modulus | 5.9 | 7.1 |

NOTE: Stabilizer-1 is an alkylated phenol.

EXAMPLE 5

Following the procedure of Example 1, similar compositions were prepared, vulcanized and tested except that instead of lithium chloride zinc chloride, magnesium chloride or calcium chloride was used at a level of 4 parts by weight per 100 parts by weight of nylon and further except that in place of the zinc peroxide of Example 1 zinc oxide (3 parts), magnesium oxide (1.5 parts), magnesium hydroxide (2.1 parts) and calcium oxide (2.1 parts) were used. Testing of these vulcanizates showed that they possessed similar properties to those of Experiment #1 of Example 1.

What is claimed is:

1. A vulcanizable rubbery composition comprising, per 100 parts by weight of polymeric materials, as one polymeric material from about 10 to about 32.5 parts by weight of a crystalline polyamide and as a second polymeric material from about 67.5 to about 90 parts by weight of a synthetic rubbery polymer which polymer comprises, for a total of 100 parts by weight, from about 25 to about 40 parts by weight of acrylonitrile or methacrylonitrile, from about 0.5 to about 10 parts by weight of one or more α,β-unsaturated carboxylic acid and the balance butadiene, and as non-polymeric additives from about 0.1 to about 15 weight percent based on polyamide of an additive selected from the halides of lithium, magnesium, calcium and zinc, and from about 1 to about 10 parts by weight per 100 parts by weight of polymeric materials of an additive selected from the oxides and hydroxides of magnesium, calcium, barium and zinc and the peroxides of calcium and zinc and further comprising sulphur vulcanization active agents.

2. The composition of claim 1 wheein the synthetic rubbery polymer comprises from about 25 to about 40 parts by weight of acrylonitrile, from about 0.5 to about 10 parts by weight of one or more α,β-unsaturated carboxylic acid selected from acrylic, methacrylic, fumaric, maleic and itaconic acids and the balance butadiene for a total of 100 parts by weight.

3. The composition of claim 2 wherein the halide additive is selected from the chlorides and bromides of lithium, magnesium, calcium and zinc and is present in an amount of from about 2 to about 10 weight percent based on polyamide.

4. The composition of claim 3 wherein the additive is lithium chloride.

5. The composition of claim 2 wherein the second additive is selected from zinc oxide, zinc hydroxide, zinc peroxide, magnesium oxide, magnesium hydroxide, calcium oxide and calcium hydroxide and is present in an amount of from about 2 to about 8 parts by weight per 100 parts by weight of polyamide plus synthetic polymer.

6. The composition of claim 5 wherein the additive is zinc peroxide.

7. The composition of claim 1 which also contains one or more of fillers, plasticizers, processing aids and antioxidants or stabilizers.

8. The composition of claim 7 which contains fillers selected from carbon black, titanium dioxide, silica, calcium silicate, clay, calcium carbonate and mixtures thereof, in an amount of from about 5 to about 100 parts by weight per 100 parts by weight of polyamide plus synthetic polymer.

9. A process for producing a vulcanizable rubbery polymeric composition comprising mixing from about 10 to about 32.5 parts by weight of a crystalline polyamide and from about 0.1 to about 15 weight percent based on the polyamide of an additive selected from the halides of lithium, magnesium, calcium and zinc at a temperature of from about 180° C. to the melting point of the polyamide for a time sufficient to yield an essentially uniform mixture, from about 67.5 to about 90 parts by weight of a synthetic rubbery polymer, for a total of 100 parts by weight of polyamide and synthetic polymer, is mixed with said polyamide and additive or subsequently added to and mixed with the polyamide-additive mixture, said synthetic polymer comprising, for a total of 100 parts by weight, from about 25 to about 40 parts by weight of acrylonitrile or methacrylonitrile, from about 0.5 to about 10 parts by weight of one or more α,β-unsaturated carboxylic acid and the balance butadiene, an additive selected from the oxides and hydroxides of magnesium, calcium, barium and zinc and the peroxides of calcium and zinc in an amount of from about 1 to about 10 parts by weight per 100 parts by weight of polyamide and synthetic polymer, is added and mixed therewith in a second stage of mixing at a temperature of from about 50° to about 125° C., and sulphur vulcanization active agents are added in said second stage or in a third stage of mixing to yield an essentially uniform vulcanizable rubbery polymeric composition.

10. The process of claim 9 wherein the mixing of the polyamide and the halide additive is at a temperature of from about 180° to about 230° C.

11. The process of claim 9 wherein the synthetic polymer is mixed with the polyamide and halide additive.

12. The process of claim 9 wherein the synthetic polymer is added to and mixed with the polyamide-additive mixture.

13. The process of claim 9 wherein the second additive and the sulphur vulcanization active agents are added in a second stage of mixing.

14. The process of claim 12 wherein the synthetic polymer, the second additive and the sulphur vulcanization active agents are added in a second stage of mixing.

15. The process of claim 9 in which the vulcanizable rubbery polymeric composition is vulcanized by heating at temperatures from about 150° to about 180° C. for times of from about 5 to about 60 minutes.

16. The process of claim 9 wherein processing aids, plasticizers, fillers, antioxidants and stabilizers are added to the composition.

* * * * *